Nov. 4, 1969    C. O. VAN NOTE, JR., ET AL    3,476,415
COUPLING
Filed Oct. 6, 1967    3 Sheets-Sheet 2
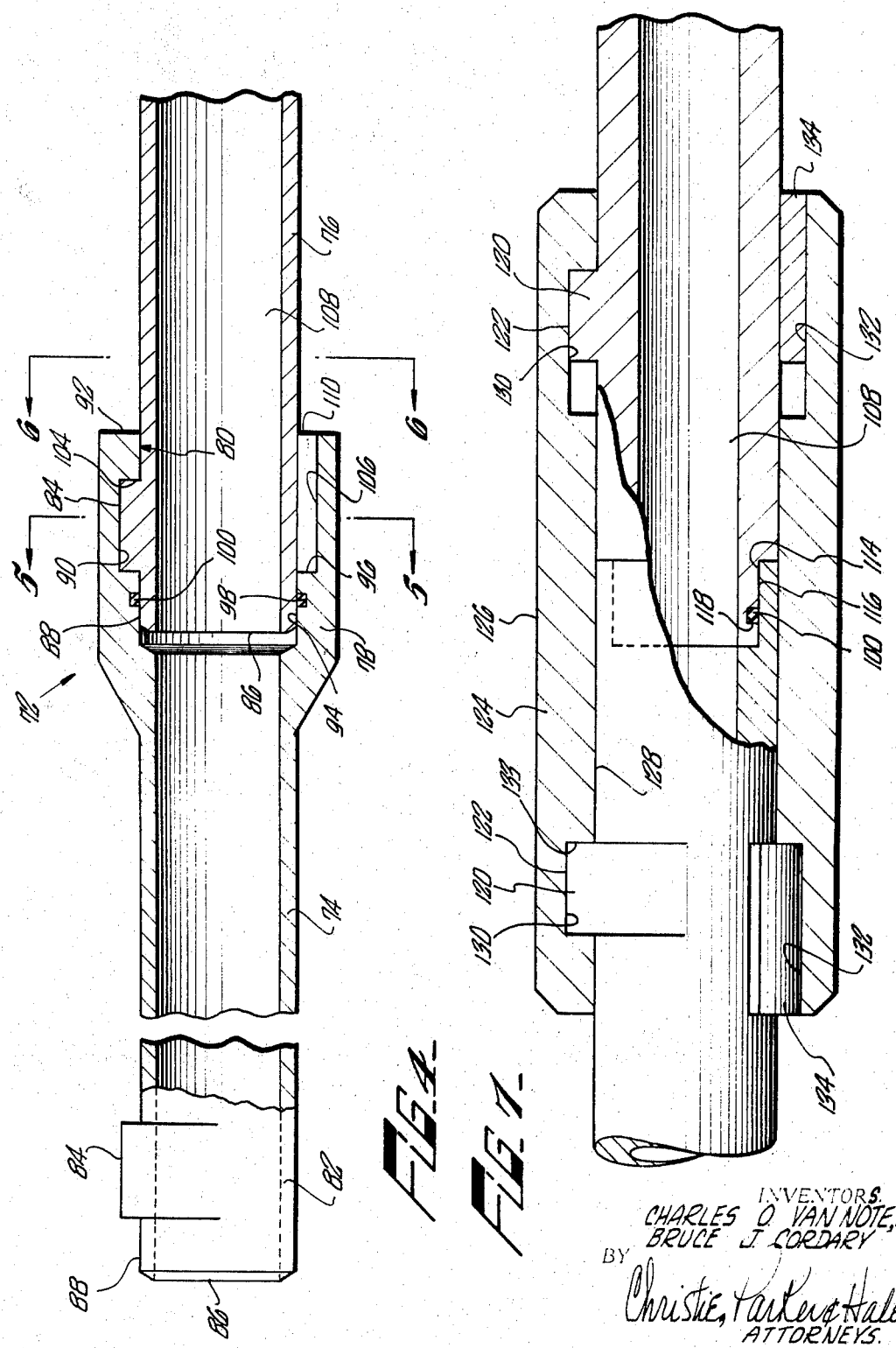
INVENTORS.
CHARLES O. VAN NOTE, Jr.
BRUCE J. CORDARY
BY
Christie, Parker & Hale
ATTORNEYS.

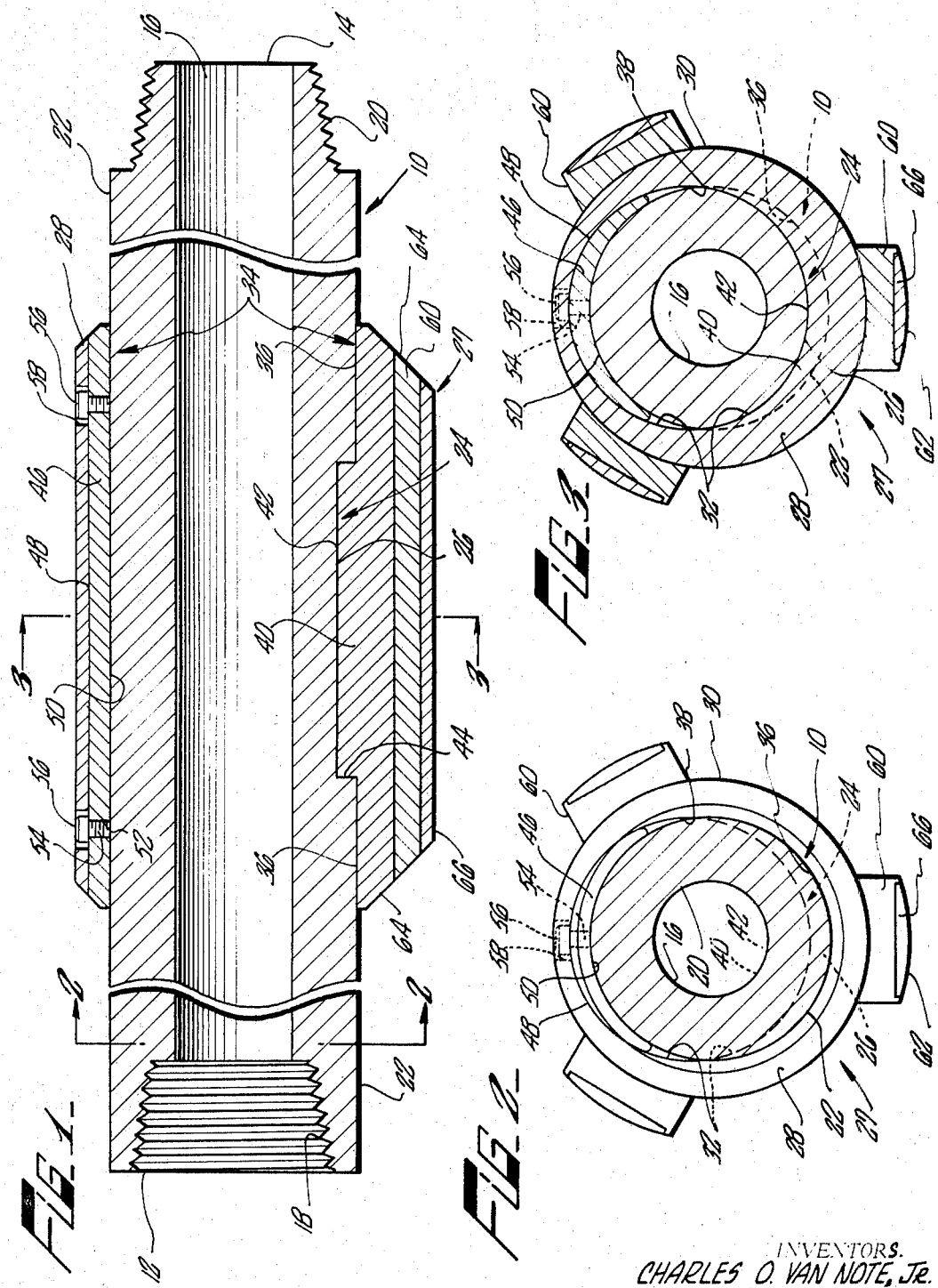

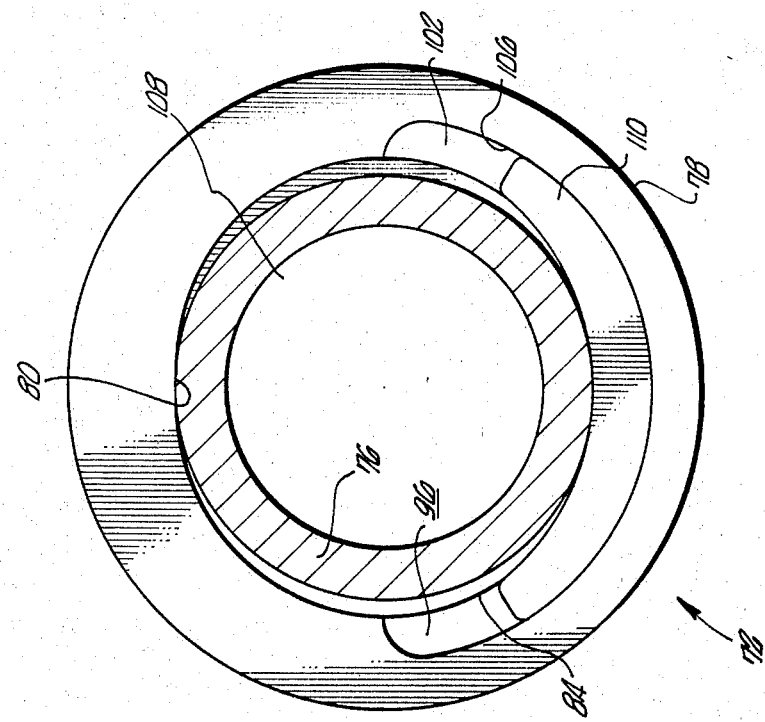
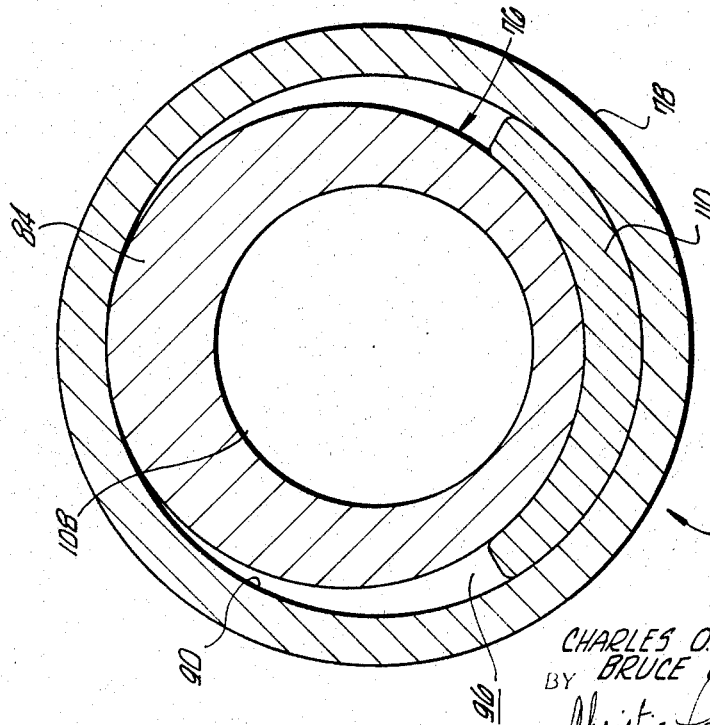

United States Patent Office 3,476,415
Patented Nov. 4, 1969

3,476,415
COUPLING
Charles O. Van Note, Rolling Hills, and Bruce J. Cordary, Los Alamitos, Calif., assignors to The Servco Company, Long Beach, Calif., a corporation of Nevada
Filed Oct. 6, 1967, Ser. No. 673,386
Int. Cl. F16l *21/00;* F16d *1/06;* F16c *3/10;* B60b *27/06*
U.S. Cl. 285—396                                 13 Claims

ABSTRACT OF THE DISCLOSURE

A coupling for joining elongated members, as, for example, those forming drill strings for boring holes in the earth. One of the members of the coupling includes an undercut and another member includes a protrusion having a configuration complementary to the configuration of the undercut. Because the protrusion and the undercut are defined by cylindrical surfaces which are eccentric relative to peripheries of the members in which they are provided, engagement of the protrusion and the undercut leave a space. Insertion of wedging means into the space prevents relative movement between the members and completes the coupling of the members.

BACKGROUND OF THE INVENTION

Field of the invention

This invention relates to couplings for elongated members.

State of the prior art

Couplings for joining members in an end-to-end relation are in general use in widely divergent technological fields. An example can be found in the art of drilling well bores, where threaded joints have been conventionally used for connecting tubular members forming the drill string and for incorporating other tool elements into the drill string. Threaded joints are points of weakness unless they are constructed oversize, adversely affect the speed with which connections are made and broken, and limit severely the locations at which tool elements, such as stabilizers and reamers, may be positioned in the drill string. The practice as to stabilizers, now to be described, is illustrative of the latter.

It has been a long-standing practice to position stabilizers adjacent the drill bit and between sections of the drill collar or drill pipe so as to enlarge the effective outer diameter of the drill string to approximately the diameter of the drilled well bore. "Whipping" of the drill string during the drilling operation is thereby minimized and the string is centralized to prevent buckling when subjected to compressive loads. In addition, "wall sticking" of the drill string is prevented. Prior art stabilizers are provided with a plurality of fins extending radially outward from a short tubular member. The fins are removably fitted into slots or grooves in the members, or they are welded to them. The member can be constructed in the form of a sleeve which is mounted on a mandrel or a sub either permanently or removably, as by threading or welding. Insertion of the stabilizer into the drill string requires, therefore, a separate tool element which must be threaded to adjacent ends of the string. The tool element itself is costly and it adds to the time required for removing a drill string from it because an additional joint must be broken. The required additional threads for using the tool elements are expensive to care for and they are potential points of failure in well drilling operations.

Moreover, it has heretofore been difficult to position stabilizers at their most effective locations, namely, immediately above the drill bit or at other positions above the bit which are more desirable and effective than at the threaded connections of the drill string. In the prior art, tool elements such as a stabilizer had to be placed between adjacent joints of drill pipe or drill collars which are commonly thirty feet long. Between the drill pipe joints, or between the drill pipe and the drill collars, or between drill collars, a short sub fitted with centralizing fins is then placed. Thus, there is a relatively arbitrary thirty-foot spacing which is often inadequate to prevent buckling. Moreover, the additional threads added by the sub increases the danger of broken threaded connections while the drill string is disposed in the well bore. A broken connection rejuires time-consuming repair work and results in substantial economic losses.

Further, stabilizers are frequently used to control directional drilling. In these instances, the stabilizers are placed at various locations on the drill string and their diameters are changed in accordance with particular requirements. For example, the placement of a stabilizer near the drill bit enables its use as a fulcrum in directional drilling. The variation of this fulcrum diameter and its distance above the drill bit enables control of the course of the drill bit. This is a highly skilled aspect of the art of controlled directional drilling. In practice, it is not uncommon for one stabilizer fulcrum point to be full hole size, centered twenty-four inches above the bit for one purpose, then moved to a distance of thiry-six inches above the bit for another purpose, and finally to be moved about twelve feet above the bit. A plurality of stabilizer fulcrum points in the first fifteen feet above the drill bit is often desired and attempted. To accomplish this aim along with variations in the outer diameter of the stabilizers, it is necessary to have many tubular members of different lengths joined by threaded connections. Since the prior art stabilizers require separate tool elements to be inserted in the drill string, the most desirable position for the stabilizer for purposes of drilling directional holes could not always be attained.

Prior art drill string connections, say between a pair of adjacent joints of drill pipe, have not always been fully satisfactory. Generally, the connections are made by conical threaded end portions of the drill pipe. To maintain the connection rotary forces may only act in one direction. If the rotary force is reversed, the connection breaks since it is unscrewed by such a force. If, for one reason or another, the string must withstand opposite rotational forces it must be replaced by one in which the connecting threads are of the opposite hand. Considering the great length of drill string, often up to 15,000 feet and more, a substantial economic investment in drill pipe alone is required. Added thereto is the expense of having to pull one string from the well bore and replacing it with another.

The relatively small size of the connecting threads on drill pipe joints, together with often substantial load can cause them to deflect sufficiently to disengage them. This, of course, breaks the connection and the continuity of the string and often requires time-consuming repair work.

SUMMARY OF THE INVENTION

Briefy, a coupling constructed in accordance with the present invention includes a first cylindrical coupling member which has an oblong hole defined by cylindrical surfaces and a second cylindrical coupling member having a configuration to enable it to be inserted into the oblong hole of the first member. The first and the second members define an undercut and a protrusion having a configuration to enable the protrusion to be disposed in the undercut. The configurations of the undercut and protrusion are defined by cylindrical surfaces which are eccentric relative to axes of the member. When engaged, the undercut and the protrusion prevent relative movements between the members in an axial direction. Wedging means are positioned intermediate the members diametrically opposite the protrusion such that the members cannot rotate or move relative to each other transversely to their axes. Means are further provided for maintaining the wedge in position intermediate the members.

This coupling can be applied to ends of members of a drill string, such as drill pipe, to join them in an end-to-end relation. The first and second members are then integrally constructed with the drill pipe and each end defines one such member. Alternatively, the ends of the drill pipe can be provided with either a protrusion or an undercut which is engageable by a sleeve. The sleeve then secures the drill pipes to each other. The coupling of this invention can also be utilized for securing well bore tools to the drill string. In this instance, the tool is preferably mounted on a sleeve which defines one of the members of the coupling.

A well bore tool such as a stabilizer can be secured to any member of the drill string, such as the drill collar, subs, or joints of drill pipe, above the drill collar. An independent tool member which must be inserted in the drill string is not required. This results in substantial time and costs savings when the string is run in or out of the hole since separate tool members need no longer be removed from and reinserted in it.

A stabilizer, for example, can be secured to the drill collar at any desired position, such as immediately adjacent the end of the drill collar mounting the drill bit. Substantially all whipping action of the drill string during its rotary motion can thereby be eliminated. The danger of having oversized well bores as well as damaged drill bits from whipping drill strings is thereby substantially reduced or eliminated.

As far as the use of stabilizers in directional drilling operations is concerned, they can now be applied at any desired position over the full length of the drill string. This substantially enhances the ease with which directional holes can be drilled and the accuracy of such holes.

If the sleeve is used as a stabilizer, fins project outwardly from the periphery of the sleeve and define its greatest diameter. The fins can be provided with an abrasive surface to use the sleeve as reamers when the well bore is to be sized or enlarged.

The coupling itself is economically manufactured since it does not require close tolerances to assure its proper operation and since it only requires relatively simple, widely available machinery. Most importantly, however, it is highly effective and virtually failproof. It transmits rotational forces in either direction equally well and it is therefore ideally suited for coupling adjacent members of a drill string as, for example, joints of drill pipe.

Structurally, the coupling includes a wedge which maintains the protrusion and the undercut in engagement. Axial forces are transmitted through the protrusion to the adjacent member. Since the protrusion can be conveniently lengthened it is adapted to transmit virtually unlimited axial loads. The wedge is disposed in the free space between the two halves of the coupling and becomes wedged between them as soon as the coupling is subjected to a rotational force. Increasing rotational forces only cause a firmer contact between the wedge and the remainder of the coupling. The rotational forces, which subject the wedge and one coupling member to compressive stresses while the other coupling member is subjected to hoop stresses, are distributed over relatively large contact surfaces between the wedge and the coupling members, thereby reducing stresses in all parts of the coupling. Potentially dangerous pointloading which can result in material failure is avoided.

BRIEF DESCRIPTION OF THE DRAWINGS

FIG. 1 is an elevational view, in section, of a drill string member provided with a stabilizer constructed in accordance with the present invention;

FIG. 2 is a plan view, in section, taken along lines 2—2 of FIG. 1;

FIG. 3 is a plan view, in section, taken along lines 3—3 of FIG. 1;

FIG. 4 is an elevational view in section of two tubular members coupled in accordance with the present invention;

FIG. 5 is a sectional view taken along line 5—5 of FIG. 4;

FIG. 6 is a sectional view taken along line 6—6 of FIG. 4; and

FIG. 7 is a elevational view, partially sectioned, of another embodiment for coupling two members in accordance with the present invention.

DESCRIPTION OF THE PREFERRED EMBODIMENTS

Referring first to FIG. 1, an elongated member 10 of a drill string has respective ends 12 and 14 and a central bore 16 for providing fluid communication between a lower end (not shown) of the drill string and an upper end (not shown). The elongated member 10 can be any one of the tubular members of a drill string, such as a joint of drill pipe, a sub for joining adjacent joints of drill pipe, or a drill collar which, adjacent its lower end, mounts a drill bit (not shown). The member may include an internal tapered thread 18 adjacent its end 12 and an external tapered thread 20 adjacent its end 14 to engage mating threads (not shown) of joints of the drill string. Alternatively, the ends are constructed as shown in FIGS. 4 and 7 and described hereinafter. Member 10 is hereinafter referred to as a drill collar, although it is to be understood that it can be any other tubular member of the drill string.

The drill collar includes a periphery 22 which is concentric with an axis of the drill collar and an arcuately-shaped undercut 24 intermediate the ends of the drill collar. The undercut has a length which is substantially less than the length of the drill collar and is preferably defined by a cylindrical surface 26 which is eccentric relative to the axis of the collar and which has a diameter substantially equal to, or a predetermined amount greater than, the outer diameter of the collar. A well bore tool for enlarging the diameter of a portion of the drill string, such as a stabilizer 27, is defined by a preferably cylindrical tubular sleeve 28 having an outer periphery 30 which is coaxial with periphery 22 of the drill collar 10 and a length which is greater than the length of the undercut 24.

Referring to FIG. 2, a bore 32 extends throughout the length of the sleeve and is eccentric relative to the periphery 30 an amount equal to the eccentricity between the cylindrical surface 26 of the undercut 24 and the periphery 22 of the drill collar. The bore 32 has a diameter which equals the diameter of the cylindrical surface 26 and therefore either substantially equals the diameter of the drill collar or is greater by the predetermined amount. The bore 32 includes an enlarged section or oblong bore 34 adjacent each end of the sleeve or, in other words, the oblong bore 34 extends throughout the length of the sleeve except for that portion which is taken up by an inwardly projecting protrusion 40 having a cylindrical wall 42 common with the eccentrically disposed bore 32. The enlarged sections are defined by cylindrical walls 36 which are concentric with the periphery 30 and have a diameter equal to the diameter of the drill collar 10. A straight transitional section 38 joins walls 36 with adjacent walls of the eccentric bore 32 to permit the sleeve to move relative to the member transversely to its axis.

The sleeve is slipped over the drill collar 10 by aligning the periphery of the drill collar with the eccentric bore 32. Thereafter, the sleeve is moved axially along the drill collar until the inwardly projecting protrusion 40 is aligned with the undercut 24. The sleeve is then moved in a radial direction until the protrusion nests in the undercut. Since the eccentricity between, as well as the diameters of, the cylindrical walls 36 and 40 in the sleeve 28 and the periphery 22 of the drill collar and the cylindrical surface 26 of the undercut 24 are equal, the cylindrical walls 34 abut the periphery 22 of the drill collar simultaneously with the abutment between the cylindrical wall 42 of the protrusion 40 and the cylindrical surface 26 of the undercut. The sleeve is therefore limited from moving in a direction parallel to the axis of the drill collar by the engagement between sides 44 of the undercut and the protrusion 40 of the sleeve.

A generally crescent-shaped wedge or holding bar 46 is disposed intermediate the sleeve 28 and the drill collar 10 opposite protrusion 40 to limit the sleeve from moving in a radial direction when the protrusion 40 and the undercut 24 are in engagement. The wedge is preferably defined by a pair of eccentric outer and inner cylindrical surfaces 48 and 50. The inner surface has a curvature of a radius equal to the radius of the periphery of the drill collar while the outer surface has a curvature of a radius equalling the radius of bore 32. Their eccentricity equals the eccentricity between the periphery 22 of the drill collar and the cylindrical surface 26 of undercut 24. The wedge is inserted in the crescent-shaped space between the collar and the sleeve. Any transverse movement of the sleeve relative to the drill collar is thus limited to an amount not exceeding the manufacturing tolerances of the parts.

In a preferred embodiment, the wedge includes a pair of threaded apertures 52 which are in engagement with a pair of threaded bolts 54, a head 56 of the bolt extending into an aperture 58 in the sleeve 28. Movement of the wedge 46 in an axial direction is thereby prevented if it has not been driven into the space and is loosely disposed therein.

The wedge is installed after the sleeve 28 has been positioned on the drill collar 10 and the protrusion 40 is in engagement with the undercut 24. While the sleeve is in this position, the wedge is axially inserted into the crescent-shaped space intermediate the sleeve and the periphery of the drill collar until the threaded apertures 52 are aligned with the apertures 58 in the sleeve. The bolts 54 are then inserted into the threaded holes and tightened against the outer periphery of the wedge.

The drill collar, as well as all other members of the drill string, are often subjected to harsh treatment which mars their peripheral surfaces. To facilitate the installation of the stabilizer 27 and enbale sleeve 28 to be slipped over the collar, portions of the collar's periphery 22 intermediate one of the ends of it and the undercut 24 may be machined under gauge. Only a short section of the collar adjacent the undercut requires a full gauge diameter to assure abutment of the various surfaces of the sleeve and the collar as described above. In this instance, the cylindrical surface 26 of undercut 24, and consequently the diameter of bore 32 as well as the outer diameter of wedge 46 and the cylindrical wall 36 of the enlarged section 34, have a diameter which substantially equals the gauge diameter of the drill collar.

Alternatively, the diameter of the drill collar is maintained at full gauge throughout its length and the cylindrical surface 26 of undercut 24, as well as the bore 32 of the sleeve and the outer cylindrical surface 48 of the wedge 46, have a diameter which is greater than the diameter of the collar by the predetermined amount. The diameter is greater by preferably about $\frac{1}{16}$ to about $\frac{1}{8}$ of an inch to assure free axial movemnt of the sleeve along the collar even if the periphery of the collar is marred. When the stabilizer is intsalled, all mating surfaces, namely, walls 36 and the periphery 22 of the collar and the cylindrical surfaces 26 and 42 of the undercut 24 and the protrusion 40, respectively, abut. Simultaneously, the inner and outer arcuate surfaces 50 and 48 of the wedge 46 abut the periphery of the collar and bore 32, respectively, so that there is no play between the collar, the wedge, and the sleeve.

The sleeve 28 is now securely mounted on the drill collar and its periphery 30 is concentric with the periphery 22 of the collar. Axial movement of the sleeve relative to the drill collar is prevented by the engagement between the protrusion 40 and the sides 44 of the undercut 24. Movement of the sleeve in a direction transverse to the axis of the drill collar is prevented by the wedge 46. Rotational movement of the sleeve relative to the drill collar is also prevented since the wedge maintains the spacing between the sleeve and the periphery of the drill collar adjacent the side of the sleeve opposite protrusion 40. To rotate the sleeve about the drill collar, the protrusion 40 would have to be positioned adjacent the side of the drill collar not provided with an undercut. This requires the sleeve to move in a direction transverse to the axis of the drill collar which is prevented by the wedge. Thus, a torque applied to the sleeve is transmitted to the drill collar by the frictional engagement between the sleeve 28, the drill collar 10, and the wedge 46. The torque additionally increases the engagement of the parts and effectively locks the sleeve to the drill collar, thereby preventing any relative movement between them.

The apertures 58 in the sleeve are preferably greater than the diameter of the head 56 of the bolt 54 to enable a slight rotational movement of a few degrees between the sleeve and the drill collar. Rotational forces between the sleeve and the drill collar are thereby transmitted directly to the wedge, even if there is some play between it, the sleeve, and the collar, instead of through the bolt heads. The latter can cause damage to the bolts and make it difficult to remove them when the sleeve is to be demounted from the collar.

A plurality of preferably three or more equally-spaced fins 60 extend radially outward from the periphery 30 of the sleeve and are suitably secured to it. Preferably, the fins are constructed integrally with the sleeve or they are welded to the sleeve as shown in FIG. 3. In the alternatively, they can be bolted (not shown) or otherwise secured to the sleeve. An outer surface 62 of the fins is cylindrical and concentric with the axis of the drill collar. The fins have a length substantially equal to the length of the sleeves, and ends of the fins adjacent ends of the sleeve include a tapered portion 64 to facilitate the insertion of the stabilizer in the well bore. If desired, the fins can be spiraled to increase the ease with which the stabilizer is rotated in a well bore.

In operation, the sleeve is mounted at desired locations to prevent or reduce movements of the drill string transverse to its axis. In particular, one such location is closely adjacent the lower end of the drill collar 10 adjacent the drill bit (not shown). The drill collar, which is provided with the arcuately-shaped undercut 24, receives a sleeve 28 as described above and is then lowered into the well. Upon reaching the bottom of the well (not shown), rotation of the drill string commences. The effective diameter of a portion of the drill collar provided with a sleeve is now enlarged to the diameter defined by the outer surfaces 62 of the fins 60. These outer surfaces are arranged such that they are closely adjacent walls (not shown) of the well bore. Any movements of the lower end of the drill string are thereby confined to the difference in size between the well bore and the outer surfaces of the fins. This can be maintained so small that whipping action is practically eliminated. The lower end of the drill string is thereby substantially fully stabilized.

The stabilizer 27 can of course be secured to any other tubular member of the drill string at locations where it is desired to stabilize the drill string or to aid in directional drilling. The tubular member can moveover have a periphery other than a round one. For example, it can be a member which has a square configuration (not shown). In addition, the drill string member can be provided with several axially-spaced undercuts to receive more than one sleeve 26 or to enable the changing of the relative position between it and the member.

The outer surfaces 62 of the fins can be provided with an abrasive surface 66, or with blades (not shown), to use the sleeve and the fins as a reamer for enlarging or sizing well bores.

Referring to FIGS. 4 to 6, a coupling 72 is employed for securing members of a drill string, such as joints of drill pipes 74 and 76, to each other. In a preferred embodiment of this invention, each pipe is provided with an upset end 78 having an eccentric bore 80. Another end 82 includes a protrusion 84 having a circular cross-section which is essentric relative to the axis of the pipe and a diameter which is greater than a diameter of the periphery of the pipe. The diameter and eccentricity of the bore 80 is slightly greater than that of the protrusion 84 to enable the latter to move axially through the former. The protrusion is set back from a face 86 to provide a cylindrical portion 88 of the pipe intermediate that face and the protrusion.

A concentric annular groove 90 is set back from a face 92 adjacent the upset end 78 and has a diameter which about equals or is slightly greater than a distance between the axis of the pipe and that portion of the protrusion 84 which is radially furthest from the axis. Projecting from groove 90 toward intermediate portions of the pipe 74 is a cylindrical bore or portion 94 which is of a sufficient diameter and length to receive the cylindrical end 88 when the protrusion 84 is axially aligned with groove 90. A distance between the end of the bore 94 and an adjacent end wall 96 of the annular groove 90 is at least as great as the distance between face 86 and the adjacent protrusion 84. A second annular groove 98 is constructed to receive packing material 100, such as a rubber O-ring for example, and is disposed in the cylindrical walls of bore 94.

A sectional recess 102 extends over an arc of less than 180° and is disposed between the face 92 and a second end wall 104 of the annular groove 90. The recess is defined by a cylindrical wall 106 which is an extension of the cylindrical wall of the annular groove 90.

Joints of drill pipe are secured to each other in an end-to-end relation by aligning the protrusion 84 with the sectional recess 102 of an adjoining pipe. The two pipes are axially moved toward each other until the protrusion 84 engages end wall 96 of the groove. In this position, the cylindrical portion 88 extends into the inner bore 94 and is in contact with the packing material 100. An inner conduit 108 is thereby sealed from the exterior of the pipes.

The two pipes are now rotated relative to each other through a 180° arc until the portion of the protrusion 84 furthest removed from the axes of the pipes is diametrically opposite the sectional recess 102. A wedge 110 is inserted into the space between the periphery of the drill pipe and the cylindrical wall 106. The wedge has a crescent-shaped cross-section with its outer surface being cylindrical and complementary to the cylindrical wall defining the recess 102. Its cylindrical inner surface has a diameter equal to the diameter of the protrusion 84 and the two surfaces are eccentric by an amount equal to the eccentricity of the periphery of the pipe and the protrusion.

When the wedge is in the recess 102, the two pipes are fixed relative to each other. Axial movements of the pipes are prevented by the engagement of the protrusion and the end walls 96 and 104 of the annular groove 90. Radial as well as rotational movement between the pipes is prevented by the wedge 110 in a manner identical to that in which wedge 46 prevents such movements between the sleeve 28 and the drill collar 10.

To maintain the wedge in position, the upset end 78 includes a radial hole (not shown) and a bolt (not shown) is threaded into the wedge in a manner identical to the manner in which bolt 54 is secured to wedge 46. Its head extends into the hole and prevents axial as well as rotational movements of the wedge.

Referring to FIG. 7, an alternative embodiment for securing joints of drill pipe to each other is illustrated. In this embodiment, each drill pipe includes a recessed bore 114 adjacent one end and a recessed cylindrical and coaxial portion 116 adjacent the other end. The cylindrical portion and the hole have diameters to permit them to be inserted into each other. An annular groove 118 for receiving the packing material 100 is disposed on the cylindrical surface of the portion 116.

Set back from both ends of the pipe are protrusions 120 which are eccentric relative to the axes of the pipes and defined by cylindrical surfaces 122. A sleeve 124 has a periphery 126 and a coaxial hole 128 of a diameter about equal to the diameter of the pipes. Adjacent each end of the sleeve and spaced apart a distance equal to the spacing between the protrusions 120 when two pipes are joined end-to-end are a pair of eccentric recesses 130 which have a configuration to mate with the protrusions. The sleeve further includes an oblong, enlarged end portion 132 which is disposed diametrically opposite the eccentric recess and which has the same configuration as the recess. The enlarged end portions extend from each end of the sleeve to a depth at least equal to the distance between the end of the sleeves and an inner axial end 133 of the eccentric recess 130.

Lengths of drill pipe are joined by first slipping the sleeve 124 over the end of one pipe and inserting the protrusion 120 in an eccentric recess. A wedge 134, having a configuration similar to wedges 46 and 110 described above, is inserted into the space between the drill pipe and the enlarged end portion 132. It is secured to the sleeve by bolts (not shown) in the aforementioned manner.

Another drill pipe is then inserted in the opposite end of the sleeve and moved axially until the recessed bore 114 and the cylindrical portion 116 are in engagement. The drill pipe is then rotated through 180° to position the protrusion 120 in the other recess 130. Another wedge 134 is inserted in the space between the pipe and the adjacent oblong hole 132. It is likewise secured to the sleeve by a bolt (not shown). The inner conduit 108 of the pipes is now continuous and sealed from the exterior by the packing material 100.

Particularly in the drilling of well bores it is sometimes desirable to secure the casing or pipe string members to each other in a manner which allows a limited amount of axial movement between them while maintaining them rotationaly fixed relative to each other. A limited freedom for axial movements is desirable when the casing or pipe string member is subjected to elevated temperatures to compensate for its thermal expansion and prevent possible buckling of the string. In such an instance the protrusion 120 is constructed to be shorter than the length of the annular groove or recess 130, as particularly shown in the right-hand portion of FIG. 7. The embodiments shown in FIGS. 1 and 4 can be similarly adapted to provide for axial movements of the casing or pipe string members.

Sections of drill pipe connected in the manner shown in FIGS. 4 through 6, or in the manner shown in FIG. 7, are positively secured to each other, do not leak, and can therefore be used for drill pipe in drilling well bores where drilling mud is circulated through the interior conduit of the drill pipe. The couplings are rugged and inexpensive as compared to drill pipe couplings that were available in the past. Both couplings are quickly connected and disconnected, resulting in substantial cost and time savings when a drill string is inserted in the well or removed therefrom.

A coupling constructed in accordance with the present invention eliminates the need for threading the ends of elongated members that are to be joined in an end-to-end relation. Also the coupling has been described and illustrated when used in conjunction with well bore drill string members; its use is not intended to and is not limited to that application. The advantages derived from the coupling of this invention are realized when connecting pipes, particularly pipes constructed of a plastic material which require substantial axial support in the vicinity of the connection, as, for example, in the construction of pressurized fluid carrying pipe lines. The coupling can also be used for connecting solid elongated members such as shafts in mechanical power transmission arrangements.

We claim:

1. A coupling for joining elongated members, the apparatus comprising:
   (a) a first cylindrical coupling member having an oblong hole defined by cylindrical surfaces;
   (b) a second cylindrical coupling member having a configuration such that the second member can be inserted into the hole of the first member;
   (c) the first and the second members defining an undercut and a protrusion having a configuration to enable it to be disposed in the undercut to prevent relative movements between the members in an axial direction, the undercut and the protrusion being further defined by cylindrical surfaces which are eccentric relative to axes of the members; and
   (d) wedging means intermediate the members substantially opposite from the protrusion such that the members cannot rotate and move relative to each other transversely to their axes.

2. Apparatus according to claim 1 wherein the wedging means is crescent-shaped and has an inner and an outer cylindrical surface defined by radii being eccentric relative to each other an amount equal to an eccentricity between the eccentric cylindrical surface of the protrusion and the axis of the members.

3. Apparatus according to claim 2 wherein a portion of the periphery of the second member intermediate the protrusion and an end of the member is of a lesser diameter than the portion of its periphery adjacent the protrusion.

4. Apparatus according to claim 2 wherein the cylindrical surface of the protrusion, the undercut, and the eccentric surface of the hole are substantially equal in diameter, which diameter is greater than a diameter of the periphery of the second member by a predetermined amount.

5. Apparatus according to claim 1 including means for maintaining the wedge in position intermediate the members.

6. Apparatus according to claim 1 wherein the coupling members are permanently secured to respective ends of an elongated member such that a plurality of such elongated members can be secured to each other in an end-to-end relation.

7. Apparatus according to claim 6 wherein the oblong hole of the first member extends from an end of the member a distance at least equal to a distance between that end and an axially spaced end wall of the undercut remote from said end.

8. Apparatus according to claim 7 wherein the protrusion projects radially away from the periphery of the second member and the cylindrical periphery of the second member extends from the protrusion to the end of the second member remote from the elongated member to which it is secured, wherein the first member defines the undercut which projects radially outward from the hole, and wherein the first member defines a coaxial cylindrical bore adapted to receive said cylindrical periphery projecting from the protrusion away from said elongated member.

9. Apparatus according to claim 8 wherein the elongated member and the second are tubular and including sealing means for sealing an inner conduit of the members from the exterior when a plurality of elongated members are secured to each other in the end-to-end relationship.

10. A coupling for joining elongated members, the apparatus comprising:
    (a) a first coupling member having a periphery, an axis, and an undercut eccentric relative to the periphery and extending over a portion of the length and the periphery of the first member;
    (b) a second coupling member having an axis and a periphery, a length greater than the length of the undercut, a first bore having a configuration complementary to a configuration of said periphery of the first member and a length no greater than a length of the undercut, and an enlarged second bore adjacent said first bore, a portion of the second bore being defined by a surface eccentric relative to a surface of the first bore by an amount equal to the eccentricity between the undercut and the periphery of the first member and having a configuration complementary to the configuration of said periphery of the first member; and
    (c) wedging means adjacent the eccentric surface of the second bore of the second coupling member to secure the two members against rotation and movement transverse to the axis when a portion of the surface defining the first bore of the second member is positioned within the undercut of the first coupling member.

11. Apparatus according to claim 10 wherein the periphery of the first member is cylindrical and the undercut, the first bore, and said surface of the second bore are defined by cylindrical surfaces having a diameter equal to a diameter of the periphery of the first member adjacent the undercut, and a portion of the first member intermediate an end thereof and the undercut has a diameter which is less than a diameter of the periphery adjacent the undercut.

12. Apparatus according to claim 10 wherein the peripheries, the undercut, the first bore, and the second bore are defined by cylindrical surfaces, the undercut has a diameter greater than a diameter of the periphery of the first member, the first bore has a diameter equal to the diameter of the cylindrical surface of the undercut, and the second bore has a diameter equal to the diameter of the periphery of the first member.

13. Apparatus according to claim 10 wherein the first and the second members are integrally connected with an elongated, tubular member and are positioned adjacent opposite ends of the elongated member.

References Cited

UNITED STATES PATENTS

| 683,656 | 10/1901 | Moyle | 287—52.09 |
| 1,054,261 | 2/1913 | Wetzel | 285—401 |
| 2,973,996 | 3/1961 | Self. | |
| 3,268,274 | 8/1966 | Ortloff et al. | |
| 3,292,708 | 12/1966 | Mundt. | |

FOREIGN PATENTS

| 1,184 | 3/1881 | Great Britain. |
| 725,583 | 2/1932 | France. |

DAVID J. WILLIAMOWSKY, Primary Examiner

W. L. SHEDD, Assistant Examiner

U.S. Cl. X.R.

285—417; 287—52.09